Oct. 8, 1935.  W. B. FLEMING  2,016,994
COUPLING DEVICE FOR SECTIONAL CONVEYERS
Filed June 7, 1934    2 Sheets—Sheet 1
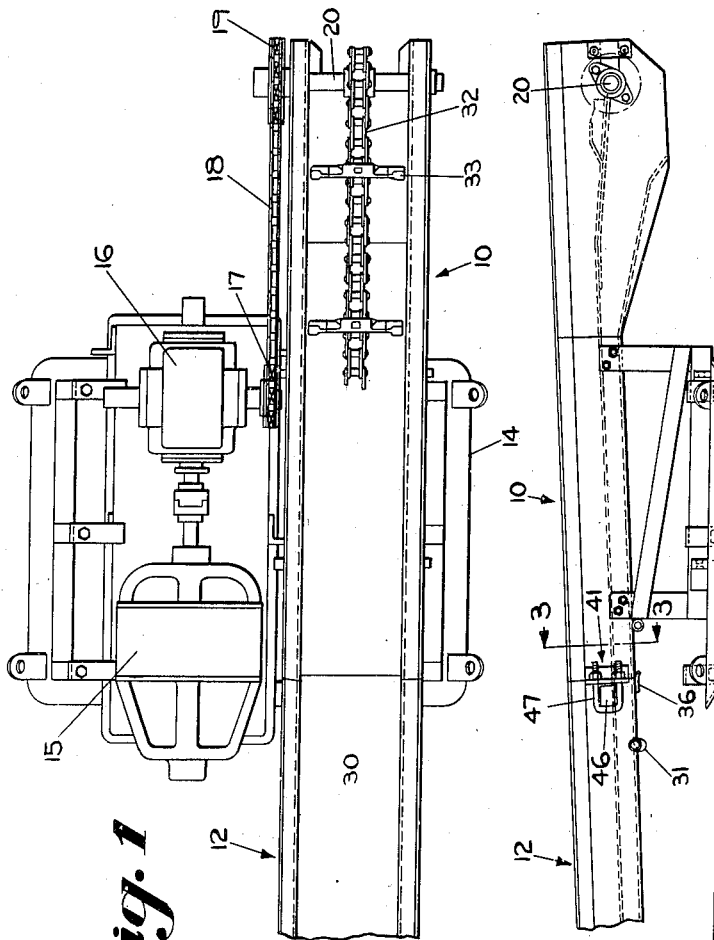
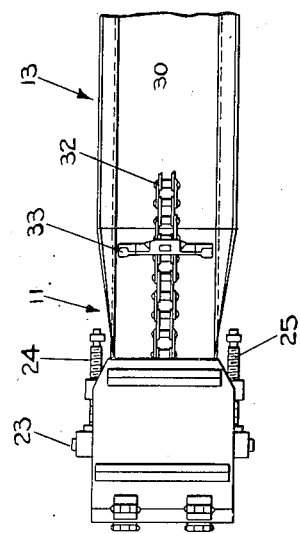
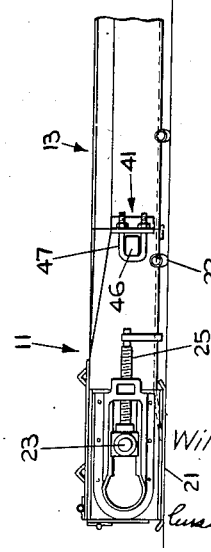
INVENTOR:
William B. Fleming,
BY
ATTYS.

Oct. 8, 1935.   W. B. FLEMING   2,016,994
COUPLING DEVICE FOR SECTIONAL CONVEYERS
Filed June 7, 1934   2 Sheets-Sheet 2
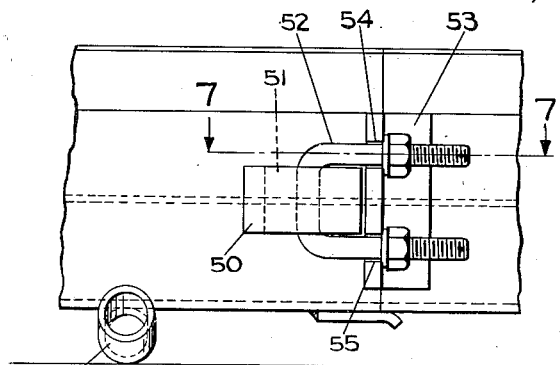
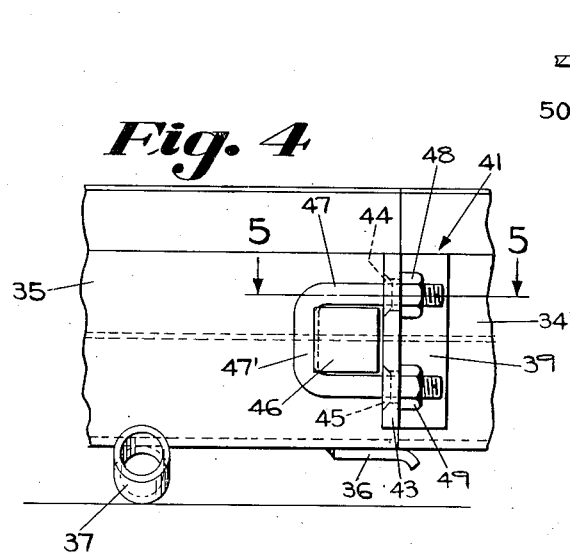
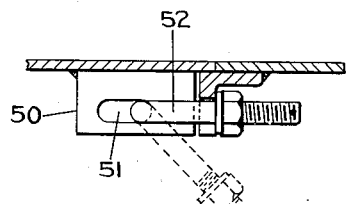
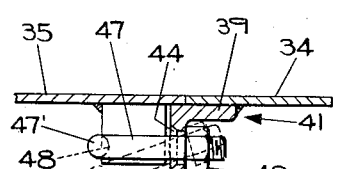
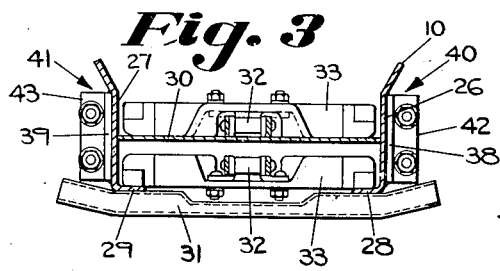
INVENTOR:
William B. Fleming,
By
Cushman, Darby, & Cushman
ATTY'S.

Patented Oct. 8, 1935

2,016,994

UNITED STATES PATENT OFFICE 2,016,994

COUPLING DEVICE FOR SECTIONAL CONVEYERS

William B. Fleming, Columbus, Ohio, assignor to The Jeffrey Manufacturing Company, a corporation of Ohio Application June 7, 1934, Serial No. 729,526

11 Claims. (Cl. 198—204)

The present invention relates to improved means for connecting together the sections of sectionally constructed apparatus, such as sectional conveyers. By way of illustration of the invention, I have shown two practical embodiments thereof in the accompanying drawings, in which:

Figure 1 is a plan view, with the intermediate portion broken away, of a sectional conveyer provided with one form of connecting means according to the present invention.

Figure 2 is a side elevation of the apparatus of Figure 1.

Figure 3 is a section substantially on line 3—3 of Figure 2.

Figure 4 is an enlarged side elevation of the adjacent portions of two sections of the conveyer of Figures 1 to 3.

Figure 5 is a section substantially on the line 5—5 of Figure 4.

Figure 6 is a side elevation of the adjacent portions of two conveyer sections provided with another form of connecting means, and Figure 7 is a section substantially on line 7—7 of Figure 6.

Referring first to Figures 1 to 5, the reference numerals 10 and 11 designate the head and foot portions, respectively, of a sectional conveyer having an intermediate portion including the sections 12 and 13, Figures 1 and 2. The head portion 10, as here shown, is supported in somewhat elevated position on a pan 14 which likewise carries an electric motor 15 and a speed reducing unit 16, the latter having an output sprocket 17 connected by a chain 18 with a sprocket 19 on a head shaft 20. The rear portion of the foot section 11 is supported on a pan 21 and its forward portion is supported on a transverse shoe or runner 22. The foot section carries a tail shaft 23, which is adjustable longitudinally of the section for tensioning purposes by means of screws 24 and 25.

The portion of the head section adjacent the intermediate section 12 is shown in cross section in Figure 3, this cross section being also that of the intermediate sections and of the forward end of the foot section. As shown in Figure 3, the conveyer frame is in the form of a trough comprising vertical side walls 26 and 27 having at their lower edges inwardly turned flanges 28 and 29, the intermediate portions of the side walls being connected by a horizontal plate 30. The flanges 28 and 29 are secured to transversely extending shoes or runners 31, the runner 31 shown in Figure 3 being that at the forward end of the intermediate section 12. Each section may be provided with an appropriate number of these runners.

The head and tail shafts are provided centrally with sprockets which engage an endless chain 32 to which are secured flights 33. On the upper run of the chain, the flights 33 travel on plate 30, which is a material supporting plate, and on the lower run the ends of the flights slide on flanges 28 and 29 as clearly shown in Figure 3. As here shown, the upper marginal portions of side walls 26 and 27 of the conveyer frame or trough are outwardly flared and no hold-down means are provided for the flights on the upper run of the chain. In a construction of this nature, it is preferable to connect the sections rigidly together, so that no dips are provided in the conveyer line which would enable the flights to pull upwardly away from the material supporting surface. The connecting means of the present invention are particularly designed to provide a rigid connection for the conveyer sections, although not limited to such use.

In Figures 4 and 5, reference numerals 34 and 35 are assumed to designate the adjacent ends of two intermediate conveyer sections, both being of exactly the cross section shown in Figure 3 and having square ends, so that the adjacent ends of their longitudinal structural elements are adapted to be brought into abutment, preferably throughout. On each of the bottom flanges of the side walls of trough 35 are secured, as by welding, clips as at 36, which project somewhat beyond the end of the trough and are provided with downwardly turned extremities so as to guide the similar flanges of the adjacent trough 34 into vertical alignment with the similar flanges of trough 35 and to maintain this alignment, assuming that the adjacent end of trough 35 is supported as is the case in Figure 4, this end resting on the runner 37. The side walls of trough 34 have secured thereto the flanges 38 and 39 of angle bars 40 and 41, the same as are particularly shown in Figure 3 at the rear end of the head section. The flanges 38 and 39 project somewhat beyond the end of the associated trough, thus providing exposed marginal portions between which the side walls of the adjacent trough are guided for horizontal alignment. The angle bars 40 and 41 have laterally projecting flanges 42 and 43, which are provided with top and bottom apertures as at 44 and 45, Figures 4 and 5. Secured to the adjacent trough and in slightly spaced relation to the angle bars when the trough ends are in abutment are blocks as at 46, these blocks being intermediate the apertures 44 and 45 as regards vertical disposition. U-bolts as at 47 have shank portions passed through the apertures as at 44 and 45, and have nuts as at 48 and 49 threaded thereon. The head or cross portion 47' of each U-bolt is adapted to be brought into gripping engagement with the associated block 46 when the nuts are tightened, the blocks being provided with depressions or grooves as at 48 in which the cross portions are adapted to seat securely. The shank portions of the bolt have a considerable threaded extent beyond the tightened nuts, it being a feature of the invention that in assembling or disassembling the sections the nuts need not be removed from the shanks, but need only be loosened. The apertures 44 and 45, as here shown, are countersunk and loosely receive the shank portions of the U-bolts, so that when the nuts are loosened the bolts may be swung between the full and dotted line positions of Figure 5, the bolts being out of engagement with the blocks in the dotted line position, this being the position preliminary to assembly and disassembly of the sections.

The angle bars and blocks are rigidly secured to the respective trough ends as by welding or otherwise, and when the nuts and heads are tightly drawn against these abutment elements, respectively, the section ends are tightly drawn together and by reason of the extent of their abutting end surfaces a very rigid joint is provided, the action of the tension members or links being supplemented by the other aligning provisions above described. It will be noted in Figure 2 that the weight of the forward end of section 12 is entirely supported by the coupling means and the coupling means also serve entirely to provide vertical alignment of the section ends, this being the case since the forward end of section 12, which carries the aligning elements, as at 36, is not supported by the runner 31.

Similar connecting means are preferably provided for all the sections which are to be joined, including the head and foot sections.

As above pointed out, a very advantageous feature of the described coupling is that it is at no time necessary to remove the nuts from the bolts, so that the latter are always retained in connection with their associated angle bars. Heretofore, it has been proposed to connect adjacent flanges by means of bolts passed through apertures in the flanges. In assembling and disassembling sections provided with such coupling means the nuts must be removed and they and the bolts are frequently lost, giving rise to delay and unnecessary time and replacement expense. This is entirely avoided according to the present invention. If desired, the free ends of the bolts may be upset or otherwise provided with abutment means to prevent entire removal of the nuts. I have here merely shown the threaded portions as being of considerable extent so that there will be very little tendency for the mechanic to screw the nuts entirely off since relatively slight displacement thereof suffices to permit the coupling and uncoupling operations to be readily accomplished.

In Figures 6 and 7, the trough construction is exactly the same as that shown in Figures 4 and 5. In this case, however, the blocks, as at 50, are provided with elongated slots as at 51, in which the head or cross portions of the bolts, as at 52, are pivotally engaged, the length of the slots being sufficient to permit the bolts to be inserted and turned to position without binding. The angle bars, as at 53, instead of being provided with holes as in the embodiment first described, are provided with laterally open recesses as at 54 and 55, into and out of which the bolt shanks are adapted to be swung. Otherwise, these couplings function exactly as those first described.

While I have described practical forms which the invention may take, it will be understood that the disclosure herein is by no means restrictive of the invention, since various changes may be made in details and arrangement without departure from the invention. It is particularly pointed out that the invention is not necessarily limited as regards the form of the frames or troughs to be connected.

I claim:

1. In an apparatus of the class described, a pair of conveyer frames operatively disposed in end to end relation and including side walls having end faces disposed in abutting relation, combined aligning means and securing means for the adjacent ends of said frames for holding the same rigidly in predetermined position, said combined means comprising members fixed to the outer faces of the side walls of one frame and adapted to overlap the end of the side walls of the other frame, members secured to the outer faces of the side walls of the second mentioned frame adjacent the abutting end thereof, and tensionable bolts having their shanks extending through one of said members and being swingably connected at their other ends to said members on the other frame to permit disengagement of said other ends therefrom.

2. In an apparatus of the class described, a pair of conveyer frames operatively disposed in end to end relation and including side walls having end faces disposed in abutting relation, aligning means for the adjacent ends of said frames and securing means for holding the frames in the position effected by said aligning means, said aligning means comprising members fixed to the side walls of one frame and overlapping the end of the side walls of the other frame, said securing means comprising a member on the other frame adjacent the abutting end thereof and a bolt operatively engaged with the members on said frames, said bolt having a nut threaded thereon adapted to draw the frames into rigid abutting relation, said bolt at one end of its ends being swingably mounted and at its other end being readily disconnectibly attached, whereby the latter end may be disconnected from one frame by swinging the bolt at the other end, and without disengaging the bolt from the other frame at the swingably mounted end.

3. In an apparatus of the class described, a pair of conveyer troughs operatively disposable in end to end relation, and each comprising side walls and bottom flanges having end faces disposable in abutting relation, aligning means for the adjacent trough ends comprising guide plates secured to the bottom flange of one of the troughs and adapted to underlie the undersurface of the bottom flange of the adjacent trough end, and members secured to the outer surfaces of the side walls of one of the trough ends and disposable in overlapping relation to the ends of the side walls of the other trough, and readily disconnectible means for securing the trough ends in the position effected by said aligning means, comprising members secured on the second-mentioned trough disposable adjacent the overlapping members on the first-mentioned trough when the parts are assembled and a tensionable bolt disposable between said members to draw the parts together, said bolt being swingably mounted at one end to one of said members and readily disconnectibly engageable with the member on the other trough section at its other end.

4. In an apparatus of the class described, a pair of frames operatively disposed in end to end relation and including side walls having end faces disposed in abutting relation, aligning means for the adjacent ends of said frames, and securing means for holding the frames in the position effected by said aligning means, said aligning means comprising angle bars fixed to the side walls of one frame and adapted to overlap the end of the side wall of the other frame, said securing means comprising a block on the other frame adjacent the abutting end thereof and a U-bolt engaging said block and having its shank portions extending through the adjacent angle bar on the first section, said U-bolt being swingably connected at one of its ends to permit disengagement of its other end from one of said frames.

5. In an apparatus of the class described, a pair of troughs operatively disposable in end to end relation and each comprising side walls and bottom flanges having end faces disposable in abutting relation, aligning means for the adjacent trough ends comprising angle bars having flanges secured to the side walls of one of the trough ends with marginal portions of the flanges projecting in overlapping relation to the side walls of the adjacent trough ends and independent guide plates secured to the bottom flanges of one of the troughs and underlying the undersurface of the bottom flanges of the adjacent trough ends, and readily disconnectible means for securing the trough ends in aligned position, said means comprising a block on the second mentioned trough adjacent the projecting angle bar and a tensionable bolt disposable between the angle bar and block to draw the parts together, said bolt being swingable at one end for disconnection with the trough at the other end.

6. In apparatus of the class described, a pair of troughs operatively disposable in end to end relation, each of said troughs having side walls having end faces disposable in abutting relation, aligning means for the adjacent trough ends comprising angle bars having flanges secured to the side walls of one of the trough ends with marginal portions of the flanges projecting in overlapping relation to the side walls of the adjacent trough end, abutments on the side walls of said adjacent trough end, and U-bolts connecting the other flanges of said angle bars and said abutments, said U-bolts being swingably mounted adjacent one of their ends to permit ready disengagement from the trough adjacent their other ends.

7. In apparatus of the class described, a pair of troughs operatively disposable in end to end relation, each of said troughs having side walls, aligning means for the adjacent trough ends comprising angle bars having flanges secured to the side walls of one of the trough ends with marginal portions of the flanges projecting in overlapping relation to the adjacent trough end, abutments on the side walls of said adjacent trough end, U-bolts having their shank portions received in openings provided in the other flanges of said angle bars, and nuts threaded on said shank portions, the cross portion of said bolts being engaged with said abutments, said shank portions being swingable in said openings to permit disengagement of said cross portions from said abutments when the nuts are loosened.

8. In apparatus of the class described, a pair of troughs operatively disposable in end to end relation, each of said troughs having side walls, aligning means for the adjacent trough ends comprising angle bars having flanges secured to the side walls of one of the trough ends with marginal portions of the flanges projecting in overlapping relation to the adjacent trough end, abutments on the side walls of said adjacent trough end, U-bolts having their shank portions received in openings provided in the other flanges of said angle bars, and nuts threaded on said shank portions, the cross portions of said bolts being engaged with said abutments, said shank portions being swingable in said openings to permit disengagement of said cross portions from said abutments when the nuts are loosened said abutments being in the form of blocks and having depressions for the reception of said cross portions.

9. In apparatus of the class described, a pair of troughs operatively disposable in end to end relation, each of said troughs having side walls, aligning means for the adjacent trough ends comprising angle bars having flanges secured to the side walls of one of the trough ends with marginal portions of the flanges projecting in overlapping relation to the adjacent trough end, abutments on the side walls of said adjacent trough end, U-bolts having their shank portions received in openings provided in the other flanges of said angle bars, and nuts threaded on said shank portions, the cross portion of said bolts being engaged with said abutments, said openings being countersunk to permit swinging of said bolts to disengage them from said abutments when the nuts are loosened.

10. In apparatus of the class described, a pair of troughs operatively disposable in end to end relation, each of said troughs having side walls, aligning means for the adjacent trough ends comprising angle bars having flanges secured to the side walls of one of the trough ends with marginal portions of the flanges projecting in overlapping relation to the adjacent trough end, abutments on the side walls of said adjacent trough end, U-bolts having their cross-portions pivotally engaged in holes in said abutments, and nuts threaded on the shank portions of said bolts, the other flanges of said angle bars having recesses receiving said shank portions, said shank portions being swingable into and out of said recesses when the nuts are loosened.

11. In apparatus of the class described, a pair of troughs operatively disposable in end to end relation, each of said troughs having side walls, aligning means for the adjacent trough ends comprising angle bars having flanges secured to the side walls of one of the trough ends with marginal portions of the flanges projecting in overlapping relation to the adjacent trough end, abutments on the side walls of said adjacent trough end, U-bolts having their cross-portions pivotally engaged in holes in said abutments, and nuts threaded on the shank portions of said bolts, the other flanges of said angle bars having recesses receiving said shank portions, said shank portions being swingable into and out of said recesses when the nuts are loosened, the holes in said abutments being elongated to permit insertion of the bolts to position.

WILLIAM B. FLEMING.